(12) United States Patent
Bollinger et al.

(10) Patent No.: US 10,889,275 B2
(45) Date of Patent: Jan. 12, 2021

(54) WHEEL SENSORS WITHIN VEHICULAR BRAKE ASSEMBLIES

(71) Applicants: Steven R. Bollinger, Granger, IN (US); Markus C. Carrison, Goshen, IN (US); Samuel N. Lievore, Elkhart, IN (US)

(72) Inventors: Steven R. Bollinger, Granger, IN (US); Markus C. Carrison, Goshen, IN (US); Samuel N. Lievore, Elkhart, IN (US)

(73) Assignee: Dexter Axle Company, Elkhart, IN (US)

( * ) Notice: Subject to any disclaimer, the term of this patent is extended or adjusted under 35 U.S.C. 154(b) by 178 days.

(21) Appl. No.: 16/350,268

(22) Filed: Oct. 23, 2018

(65) Prior Publication Data

US 2020/0122698 A1  Apr. 23, 2020

(51) Int. Cl.
| | |
|---|---|
| *G01P 3/44* | (2006.01) |
| *B60T 8/32* | (2006.01) |
| *B60T 8/171* | (2006.01) |
| *B60T 8/17* | (2006.01) |
| *G01P 3/42* | (2006.01) |
| *F16D 65/10* | (2006.01) |

(52) U.S. Cl.
CPC ............... *B60T 8/32* (2013.01); *B60T 8/171* (2013.01); *B60T 8/1708* (2013.01); *G01P 3/42* (2013.01); *G01P 3/44* (2013.01); *F16D 65/10* (2013.01)

(58) Field of Classification Search
CPC ..................................... G01P 3/42; G01P 3/44
USPC ................. 73/115.07, 115.08, 121, 128, 129
See application file for complete search history.

(56) References Cited

U.S. PATENT DOCUMENTS

| 3,812,391 | A | * | 5/1974 | Johnson | ................... | B60T 8/329 |
| | | | | | | 310/168 |
| 4,698,536 | A | * | 10/1987 | Oohori | ...................... | B60T 1/06 |
| | | | | | | 188/181 A |
| 4,907,445 | A | * | 3/1990 | Okumura | ............ | B60B 27/0005 |
| | | | | | | 324/173 |
| 5,281,911 | A | * | 1/1994 | Caron | ..................... | G01P 3/488 |
| | | | | | | 324/174 |
| 5,476,272 | A | * | 12/1995 | Hixson, II | .............. | G01P 3/443 |
| | | | | | | 277/317 |
| 5,491,407 | A | * | 2/1996 | Maxson | .............. | B60B 27/0005 |
| | | | | | | 324/174 |

(Continued)

*Primary Examiner* — Eric S. McCall
(74) *Attorney, Agent, or Firm* — Botkin & Hall, LLP

(57) ABSTRACT

Detectable indicia are provided on the interior circumferential rim of the brake hub-drum adjacent to, and spaced apart from, the backing plate of the brake. A sensor is mounted on the backing plate to detect wheel speed and/or other operating conditions detectable from the motion and/or relative location or condition of those indicia. The number of indicia used and the indicia spacing along the interior circumferential rim is selected as needed for a given type of sensor and/or a given application. In the case of a speed sensor, the indicia can be a series of notches in the rim along the entire interior circumferential rim, resembling a series of "teeth" into that rim. The width of those teeth can be formed wide enough to accommodate movement of the hub-drum relative to the backing plate and/or the sensor, without loss of system functionality, according to the sensing tolerances of a given sensor being used in a given application.

10 Claims, 4 Drawing Sheets

(56) References Cited

U.S. PATENT DOCUMENTS

| | | | | |
|---|---|---|---|---|
| 5,678,933 A | * | 10/1997 | Ouchi | G01P 3/443 |
| | | | | 384/448 |
| 6,568,512 B1 | * | 5/2003 | Tolani | F16D 65/125 |
| | | | | 188/18 R |
| 2003/0047363 A1 | * | 3/2003 | Makuta | B62M 7/12 |
| | | | | 180/65.51 |
| 2003/0110860 A1 | * | 6/2003 | Okada | G01P 3/443 |
| | | | | 73/593 |
| 2003/0122539 A1 | * | 7/2003 | Heimann, Jr. | G01P 3/443 |
| | | | | 324/173 |
| 2003/0201766 A1 | * | 10/2003 | Faetanini | G01P 3/443 |
| | | | | 324/173 |
| 2003/0234578 A1 | * | 12/2003 | Takahashi | F16C 33/7886 |
| | | | | 303/168 |
| 2004/0187581 A1 | * | 9/2004 | Kamiya | G01N 29/12 |
| | | | | 73/593 |
| 2006/0091723 A1 | * | 5/2006 | Pete | G01D 5/00 |
| | | | | 303/113.1 |
| 2006/0124411 A1 | * | 6/2006 | Redgrave | G01D 5/147 |
| | | | | 188/218 XL |
| 2010/0288411 A1 | * | 11/2010 | Loewe | B60C 23/043 |
| | | | | 152/419 |
| 2011/0067963 A1 | * | 3/2011 | Pahle | F16D 65/12 |
| | | | | 188/218 XL |
| 2013/0255366 A1 | * | 10/2013 | Seglo | F16D 65/60 |
| | | | | 73/121 |
| 2018/0290637 A1 | * | 10/2018 | White | B60T 8/54 |
| 2019/0101565 A1 | * | 4/2019 | Buchwitz | G01P 3/481 |
| 2019/0309810 A1 | * | 10/2019 | Sabeti | B60T 8/329 |
| 2020/0122692 A1 | * | 4/2020 | Bollinger | F16D 65/22 |

* cited by examiner

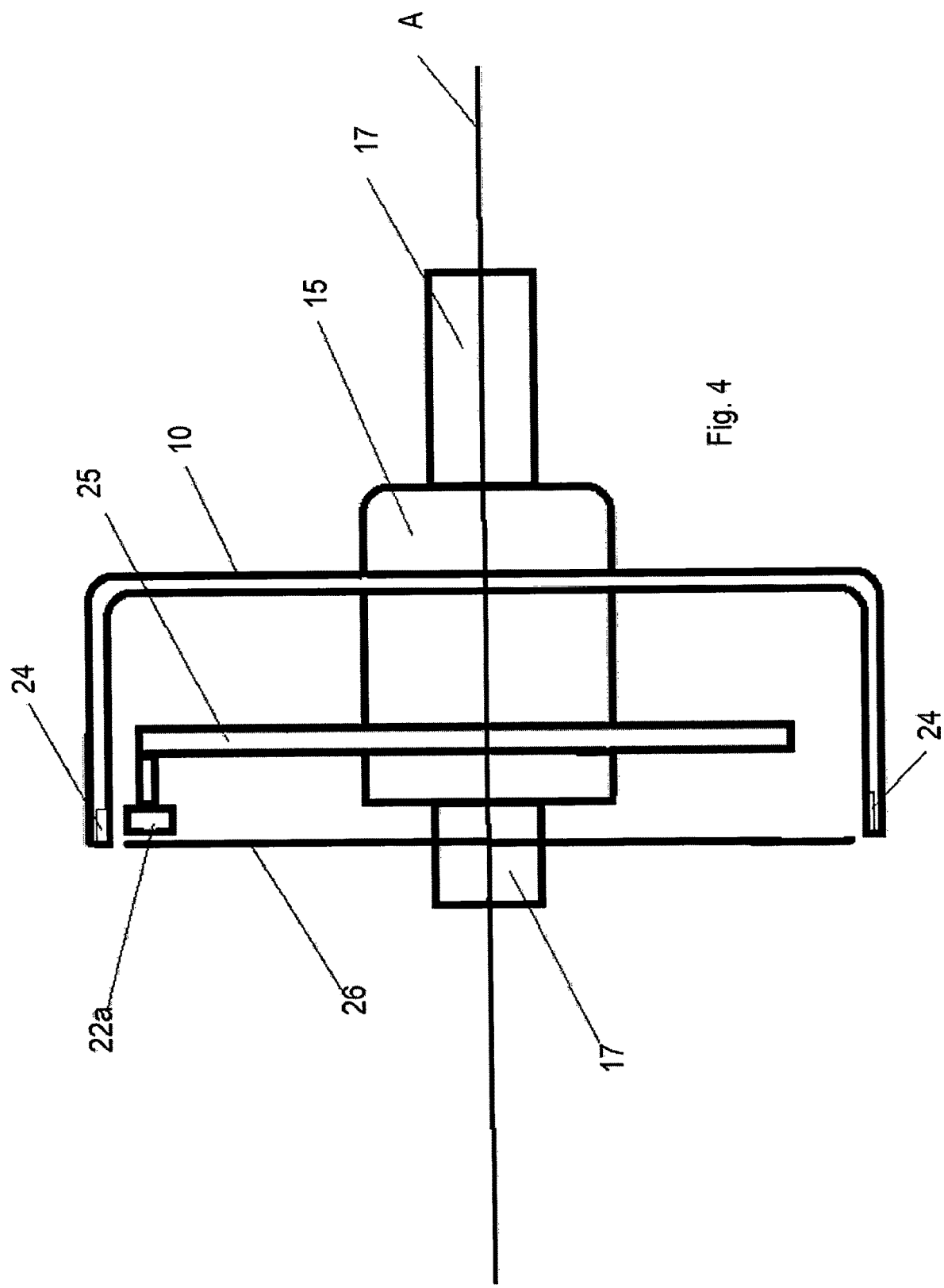

WHEEL SENSORS WITHIN VEHICULAR BRAKE ASSEMBLIES

BACKGROUND OF THE INVENTION

The present invention relates generally to wheel sensors used to detect speed and/or other operating conditions, and more particularly, the present invention relates to wheel speed sensors for towable trailers, such as cargo, industrial utility, and recreational vehicle (RV) trailers, using electric brake systems.

Various brake systems are available for use with vehicles, including hydraulic and electrically actuated brake systems. For larger brake systems, and, particularly for hydraulic brake systems, there are various solutions presently known for monitoring wheel and brake performance. In general, there are fewer spacial constraints for mounting sensors to such larger and hydraulic brake systems. Also, these systems tend to be more expensive as an overall system, so the additional cost of including performance sensors is a lower percentage of the total system cost, and that cost tends to be more readily absorbed by vehicle manufacturers, purchasers, and users.

However, for smaller brake systems, such as those used in towed RV trailers, and for electric brake systems, there are typically significant spacial constraints to placement of wheel sensors. Further, in such brake systems, sensor placement may not be able to be consistent across all brake sizes, and sensor operation can be significantly affected by variations in trailer loading and/or during vehicle turning and maneuvers when, for example, the hub-drum can move somewhat relative to the brake backing plate. Also, some prior wheel sensor systems were susceptible to damage and/or adverse impact on sensor signal reliability from road debris and exposure to the external environment. In addition, in smaller and less expensive brake systems, the additional costs associated with using reliable and durable wheel sensors are more noticeable to the purchaser of those systems.

OBJECTIVES OF THE INVENTION

Accordingly, a primary objective of the present invention is to provide an improved sensing orientation and configuration system for brake assemblies. These improvements include providing apparatus for detecting wheel speed and/or other operating characteristics which:
  a. are inexpensive to manufacture and maintain,
  b. increase traffic safety during vehicle operation,
  c. minimize component weight,
  d. facilitate use and repair, and
  e. are durable and reliable over extended use and with a wider variety of vehicles.

SUMMARY OF THE INVENTION

These and other objectives of the present invention are achieved by the provision of detectable indicia on the interior circumferential rim of the brake hub-drum adjacent to, and spaced apart from, the backing plate or another structural member of the brake. A sensor is mounted on the backing plate to detect wheel speed and/or other operating conditions detectable from the motion and/or relative location or condition of those indicia. The number of indicia used and the indicia spacing along the interior circumferential rim is selected as needed for a given type of sensor and/or a given application. In the case of a speed sensor, the indicia can be a series of notches in the rim along the entire interior circumferential rim, resembling a series of "teeth" into that rim. The width of those teeth can be formed wide enough to accommodate movement of the hub-drum relative to the backing plate and/or the sensor, without loss of system functionality, according to the sensing tolerances of a given sensor being used in a given application.

Other objects, advantages, and novel features of the present invention will become readily apparent from the following drawings and detailed description of certain preferred and alternative embodiments.

BRIEF DESCRIPTION OF THE DRAWINGS

FIG. 4 shows a cross-sectional view of an alternative trailer hub and drum assembly, taken through the axis of rotation, according to the present invention.

DETAILED DESCRIPTION OF PREFERRED EMBODIMENTS

Figure 1:
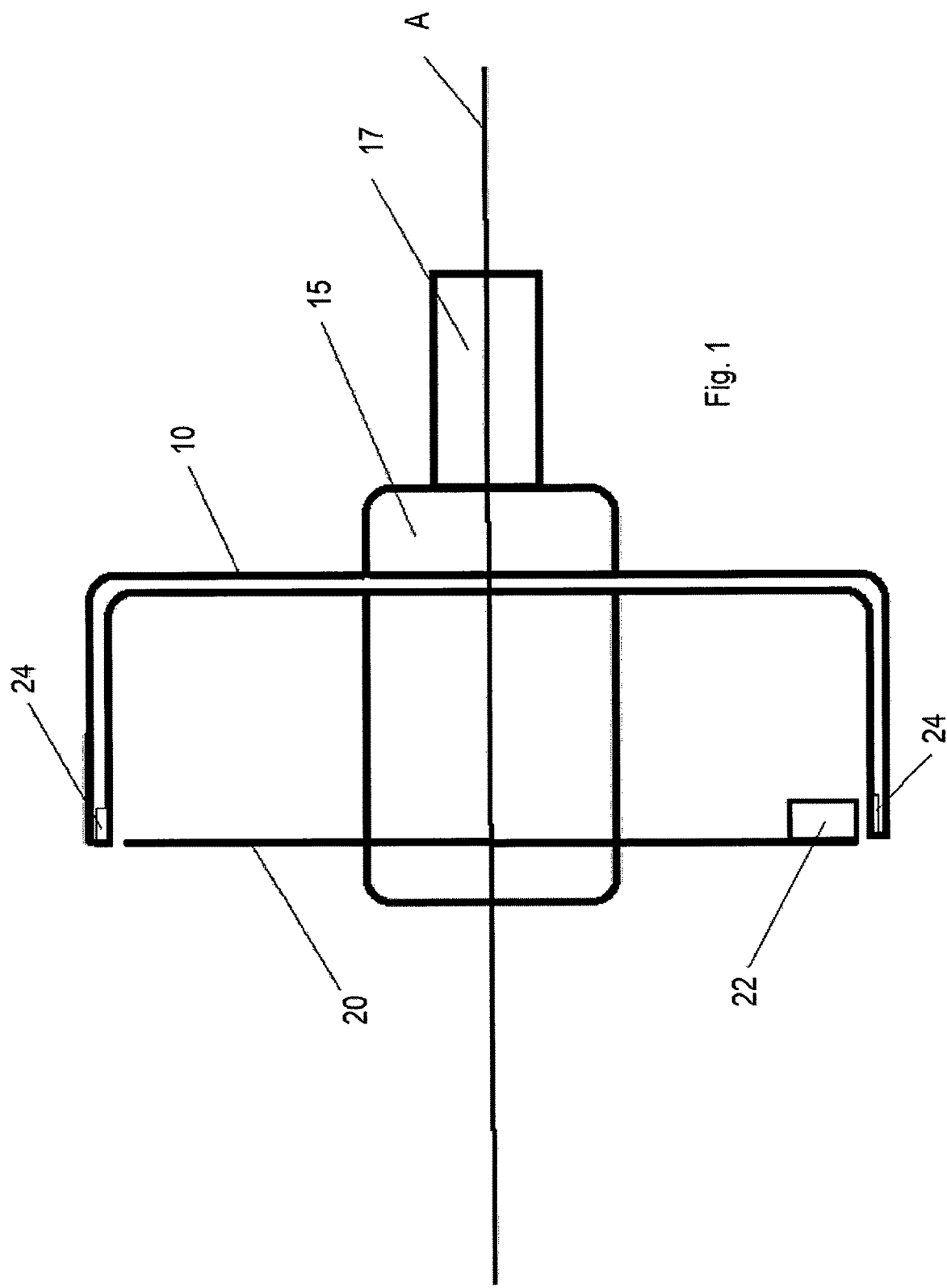
FIG. 1 shows a cross-sectional view of a trailer brake hub and drum assembly, taken through the axis of rotation, with the teachings of the present invention applied thereto.

FIG. 1 shows a trailer drum 10 and hub 15, oriented with respect to a conventional backing plate 20 of a brake system (such as an electric brake for a cargo, industrial utility or RV trailer), as mounted on spindle or axle 17 for rotation about axis A. In this embodiment, the present invention includes the provision of at least one sensor 22 on the enclosed side of backing plate 20, facing the interior of drum 10. Preferably, sensor 22 is mounted near the circumferential periphery of backing plate 20, and spaced apart from the interior circumferential rim of drum 10. The number of sensors mounted on backing plate 20, and the type of sensor device used for sensor 22 in a given application, can be selected according to the operating conditions desired to be detected, and the relative cost and reliability of a given type of sensor.

At least one detectable indicia 24 is mounted on or formed into the interior circumferential rim of drum 10, at one or more locations spaced apart from sensor 22, but within the detectable range of the sensing tolerance of a given sensor 22 being used for a given application of the present invention. As shown in the drawings, the detectable indicia illustrated is a notch or "tooth" cast, cut, machined, or otherwise formed into the interior circumferential rim of drum 10. In such instances, sensor 22 can, for example, be a Hall effect or magnetic sensor device. In other applications, sensor 22 can be an optical device, detecting light intensity variations as indicia 24 pass close by. As backing plate 20 and drum 10 rotate relative to each other, sensor 22 and indicia 24 will pass close to each other, enough so that sensor 22 will detect that event, and pass the information along to a conventional remote operational indicator, monitor, or control device. Also, according to the type of sensor being used, and/or the operational conditions being monitored, the detectable indicia may instead be reflective tape, an illumination source, a thermal emitter, or the like.

Placing the sensor and the detectable indicia within the enclosure defined by the brake hub-drum and the backing plate serves to give greater protection for the sensor against road debris and the operating environment. This placement also can be consistent between different sized brake systems. Further, this placement is often sufficiently tolerant of variations in trailer load, trailer turning/maneuvers, bearing end play, and other disturbances which can effect the spacing and orientation of brake components, that sensor signal reliability is not adversely affected, particularly where the size (width, for example) of the detectable indicia is established for a given application, by reference to the sensor range, capacity, and expected usage environment. Also, in given applications, mounting the detectable indicia at this location allows the sensor to be mounted directly to form fitting features incorporated into other brake components. As desired in a given application or embodiment of this invention, sensor 22 can be mounted at any angle relative to the circumferential edge of backing plate 20. Further, this mounting arrangement can take advantage of the "self-cleaning" characteristics of brake drums to maintain sensor reliability, and the fact that brake drums tend to be more resistant to adverse deflection issues which would affect the sensor/indicia air gap. Depending upon the operating characteristics being detected, indicia 24 can be spaced apart equally or at varying distances from each other. Also, indicia 24 can be of a uniform size and shape in certain applications, or formed of different sizes and shapes for other detection purposes.

Figure 2:
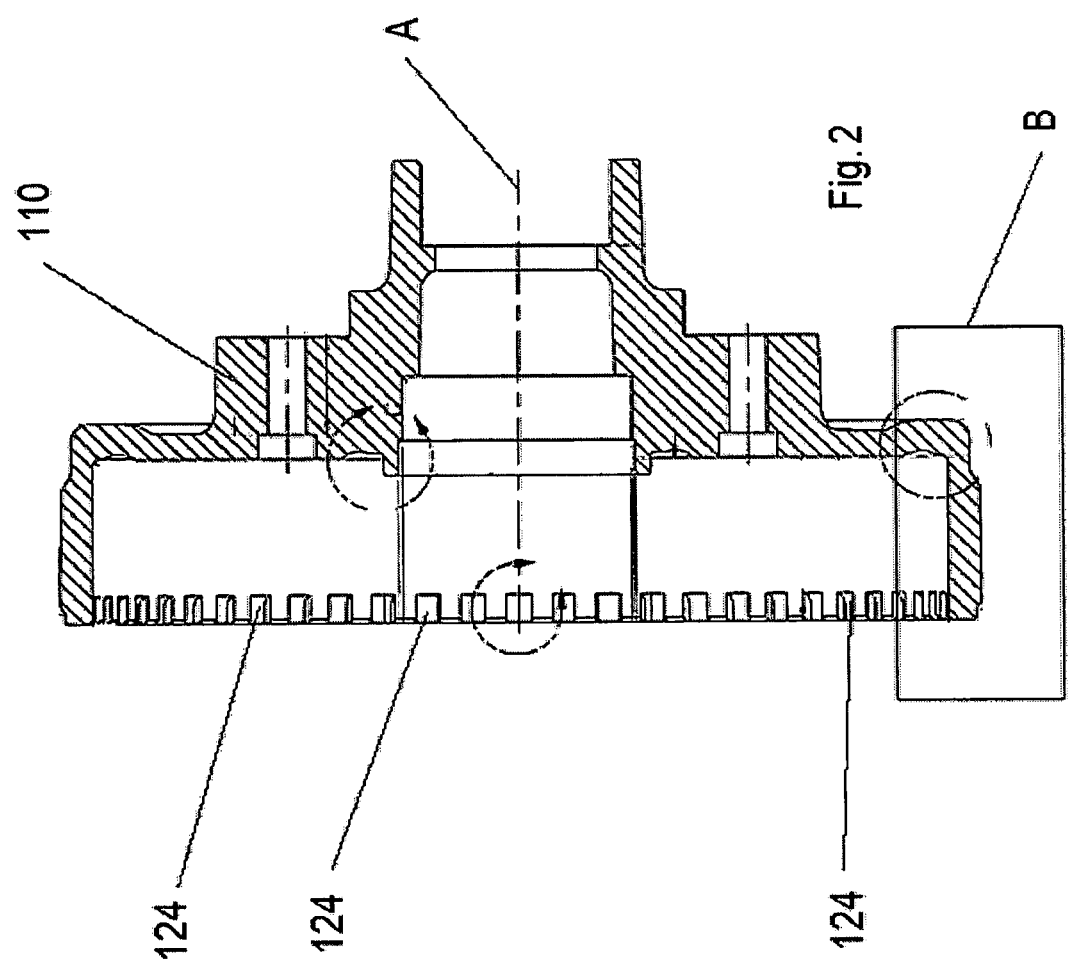
FIG. 2 shows a cross-sectional view of the brake hub-drum of a preferred embodiment of the present invention, taken through the axis of rotation.
Figure 3:
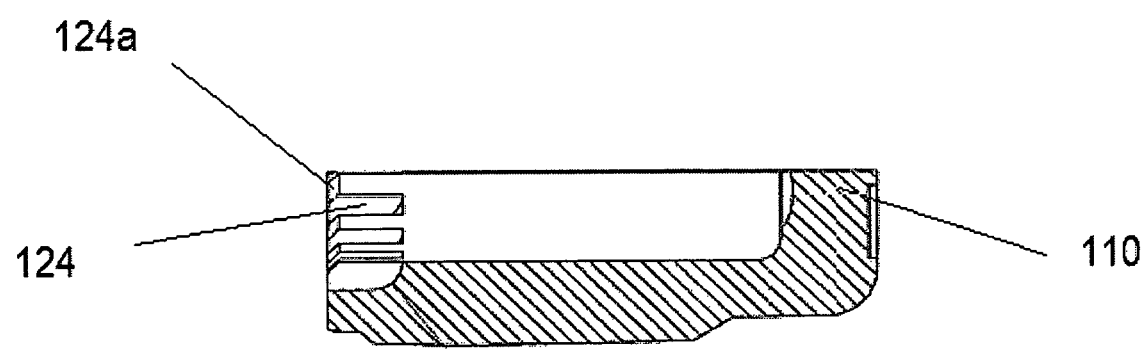
FIG. 3 shows an enlarged cross-sectional view of portion B of FIG. 2.

FIG. 2 shows a preferred embodiment of trailer hub-drum 110 according to the teachings of the present invention, with indicia 124 used for sensing wheel speed formed in the interior circumference of the drum rim. In this application, indicia 124 can, for example, be a formed as a plurality of teeth cut or cast into the interior circumferential rim, and in a pattern equally spaced apart along the entire interior rim. Using wider teeth than sensor 22 would otherwise require for such indicia, allows the wheel speed to be reliably detected regardless of vehicle loading and other angular movement forces relative to the sensor/indicia orientation. According to the requirements for a given application, indicia 124 can include a chamfer or inclined end 124a. Also, in given applications the sensor and/or indicia 124 can be partially exposed to the environment outside of the enclosure created between hub-drum 110 and the backing plate. In given applications, the backing plate can be mounted further within hub-drum 110, and/or the sensor can be mounted on the exposed side of the backing plate. In a given application, the sensor may be mounted to slide over the indicia, rather than move past the indicia spaced apart therefrom.

Although the present invention has been shown and described herein with respect to certain preferred embodiments and alternative configurations, those were by way of illustration and example only. For example, FIG. 4 shows another preferred embodiment of the present invention. Therein, the corresponding sensor 22a is mounted to a brake structural member at its radial or circumferential periphery, such as a cast iron spider 25, which is at least partially covered by a debris shield 26 spaced apart from the spider along Axis A. Similarly, the present invention could be applied to hydraulic brake systems using a rotatable brake drum.

Accordingly, the spirit and scope of the present invention is intended to be limited only by the terms of the appended claims.

What is claimed is:

1. A drum brake assembly comprising:
   a brake hub-drum, which encloses braking components, having an interior circumferential rim, a plurality of indicia located on said rim, said indicia having a greater distance from an axis of rotation than said interior circumferential rim;
   a backing plate, said brake hub-drum rotatable about said axis of rotation with respect to said backing plate; and
   a magnetic sensor fixed with respect to said backing plate, said sensor located adjacent said indicia to detect said indicia when said brake hub-drum rotates with respect to said sensor.

2. The drum brake assembly according to claim 1, wherein said indicia are formed as a pattern of teeth equally spaced apart along an entire periphery of said interior circumferential rim.

3. The drum brake assembly according to claim 1, wherein dimensions of said indicia are selected to accommodate a range of reliable detection when said sensor is subjected to relative angular movement with respect to said indicia.

4. The drum brake assembly according to claim 1, wherein said backing plate is mounted at least partially within said hub-drum, and said sensor is mounted adjacent to a radial periphery of said backing plate.

5. The drum brake assembly according to claim 4, wherein said sensor is mounted on said backing plate to remain spaced apart from said indicia when there is relative movement between said sensor and said indicia.

6. The drum brake assembly according to claim 5, wherein said backing plate and said hub-drum form an enclosure therebetween and said sensor is mounted within said enclosure.

7. A brake assembly comprising:
   a backing plate fixed with respect to a spindle, said backing plate having a radial periphery;
   a brake hub-drum, which encloses braking components, rotatable on said spindle about a central axis of rotation, said brake hub-drum having an internal circumferential surface spaced from said central axis, a plurality of indicia integrally formed into said brake drum adjacent said radial periphery of said backing plate, said indicia interrupting said internal circumferential surface, said indicia spaced from said central axis at a distance greater than said internal circumferential surface;
   a sensor affixed to said backing plate adjacent said radial periphery of said backing plate, said sensor perpendicular to said central axis, said sensor located adjacent said internal circumferential surface said sensor overlaying said indicia; and
   when said brake hub-drum rotates, said sensor senses said indicia.

8. The brake assembly of claim 7, wherein said brake hub-drum and said backing plate form an enclosure, said sensor and said indicia located in said enclosure.

9. The brake assembly of claim 7, wherein said indicia are cast into said hub-drum.

10. The brake assembly of claim 7, wherein said sensor detects said indicia with endplay of hub-drum with respect to said spindle.

* * * * *